United States Patent [19]
Prakken

[11] Patent Number: 5,460,481
[45] Date of Patent: Oct. 24, 1995

[54] DEVICE FOR PLACING OBJECTS, IN PARTICULAR FILLED BAGS, IN A ROW

[76] Inventor: Bouwe Prakken, Spijkerlaan 9, NI-3471 EG Kamerik, Netherlands

[21] Appl. No.: 150,151
[22] PCT Filed: Apr. 27, 1992
[86] PCT No.: PCT/NL92/00078
§ 371 Date: Nov. 24, 1993
§ 102(e) Date: Nov. 24, 1993
[87] PCT Pub. No.: WO92/21597
PCT Pub. Date: Dec. 10, 1992

[30] Foreign Application Priority Data
May 28, 1991 [NL] Netherlands ............... 9100920

[51] Int. Cl.[6] .................... B65G 57/00
[52] U.S. Cl. .................... 414/798.5; 414/798.2
[58] Field of Search ............... 414/798.2, 798.5; 271/2

[56] References Cited

U.S. PATENT DOCUMENTS

| | | | |
|---|---|---|---|
| 1,263,515 | 4/1918 | Biehler et al. | 414/798.5 |
| 1,501,285 | 7/1924 | Lawrence | 414/798.5 |
| 2,421,874 | 6/1947 | Fouse | 414/798.5 |
| 3,084,783 | 4/1963 | Morton et al. | 414/798.5 |
| 3,854,270 | 12/1974 | Cloud et al. | |
| 3,876,083 | 4/1975 | Evans et al. | 414/798.5 |
| 4,058,308 | 11/1977 | Johannes | |

FOREIGN PATENT DOCUMENTS

| | | |
|---|---|---|
| 0390246 | 10/1990 | European Pat. Off. . |
| 2638422 | 5/1990 | France . |
| 343586 | 3/1931 | United Kingdom . |
| 1097842 | 1/1968 | United Kingdom . |

Primary Examiner—Michael S. Huppert
Assistant Examiner—Thomas J. Brahan
Attorney, Agent, or Firm—Handal & Morofsky

[57] ABSTRACT

A device for placing objects, in particular filled bags, in a row in such a way that they overlap slanting backwards, comprises at least one rotor (3) to be driven so that it rotates, which rotor is provided with at least one cam in the form of a diameter Jump, at least one conveyor track (1) for feeding in objects to said cam, and at least one conveyor track (2) for discharging objects which have been carried along by the cam of the rotating rotor (3) and deposited on the discharge conveyor tracks. The cam (4) on rotation of the rotor (3) makes space for the object resting on said cam and to be placed on the discharge conveyor track (2), and the feed end of the discharge conveyor track (2) is situated next to the rotor (3).

8 Claims, 4 Drawing Sheets

DEVICE FOR PLACING OBJECTS, IN PARTICULAR FILLED BAGS, IN A ROW

The invention relates to a device for placing objects, in particular filled bags, in a row comprising:
  infeed means for feeding the objects one by one, said infeed means defining a substantially horizontal transport plane;
  discharge means for discharging the objects said discharge means defining a substantially horizontal transport plane,
  a rotational transfer mechanism having object receiving pockets equally angularly distanced from each other and cam means between said pockets to provide the space for a subsequent object on the discharge means,
  the conveying direction of the infeed means being the same as the conveying direction of the discharge means, as disclosed in GB-A-343,586.

Mechanisms for forming a row from objects such as filled bags in such a way that said objects overlap are known. In general, these mechanisms work in such a way that the objects overlap slanting forward, viewed in the direction of feed, on a conveyor belt: each object is placed or pushed on another object. It has been found that a row of overlapping objects slanting forward formed in this way will often have irregularities when they are moved to an upright position, due to the fact that the top edges of the objects are not lying at the same height. In the case of smooth filled bags this disadvantage is aggravated by one or more bags sliding up when the row is being placed in the upright position.

The device described in GB-A-343,586 does not give a solution for this problem since the packet shaped objects are deposited in a vertical direction on the discharge means and do not overlap each other.

The object of the invention is to avoid the abovementioned disadvantage and to provide a device with which objects can be placed coordinated in such a way in a row that they overlap slanting backwards, viewed in their feed direction, and if a row of bags is swept together to an upright position, the top edges of the objects lie essentially in one plane.

According to the invention, the device mentioned in the preamble to this end is characterized in that the discharge end of the infeed means and the infeed end of the discharge means extend within the active rotational path of the rotational transfer mechanism, and to provide said space for a subsequent object on the discharge means, the diameter of the cam means—as viewed in the rotation direction decreases gradually from one pocket to the next pocket where there is a diameter jump such that the objects are deposited in a slanting backwards overlapping position.

The infeed and discharge means can be driven conveyor belts.

In order to prevent the objects placed in a row from slipping, the conveyor belts for discharge of objects placed in a row can be provided with a profile.

The device can have two rotors placed on one shaft, in which case the infeed means extend with its discharge end and the discharge means extend with its feed end between the two rotors.

There is a possibility of the device having two adjacent feed belts and two adjacent discharge belts extending with their discharge ends and feed ends respectively on either side of the rotor or rotors.

The device can also be provided with means for pushing a number of backward slanting bags on the discharge conveyor belt(s) in the upright position against a stop.

Said means can comprise a partition and a mechanism for successively moving the partition upwards near the rotor, in a direction away from the rotor, downwards, and in a direction towards the rotor.

The invention will now be explained in greater detail with reference to the figures.

Figure 1:
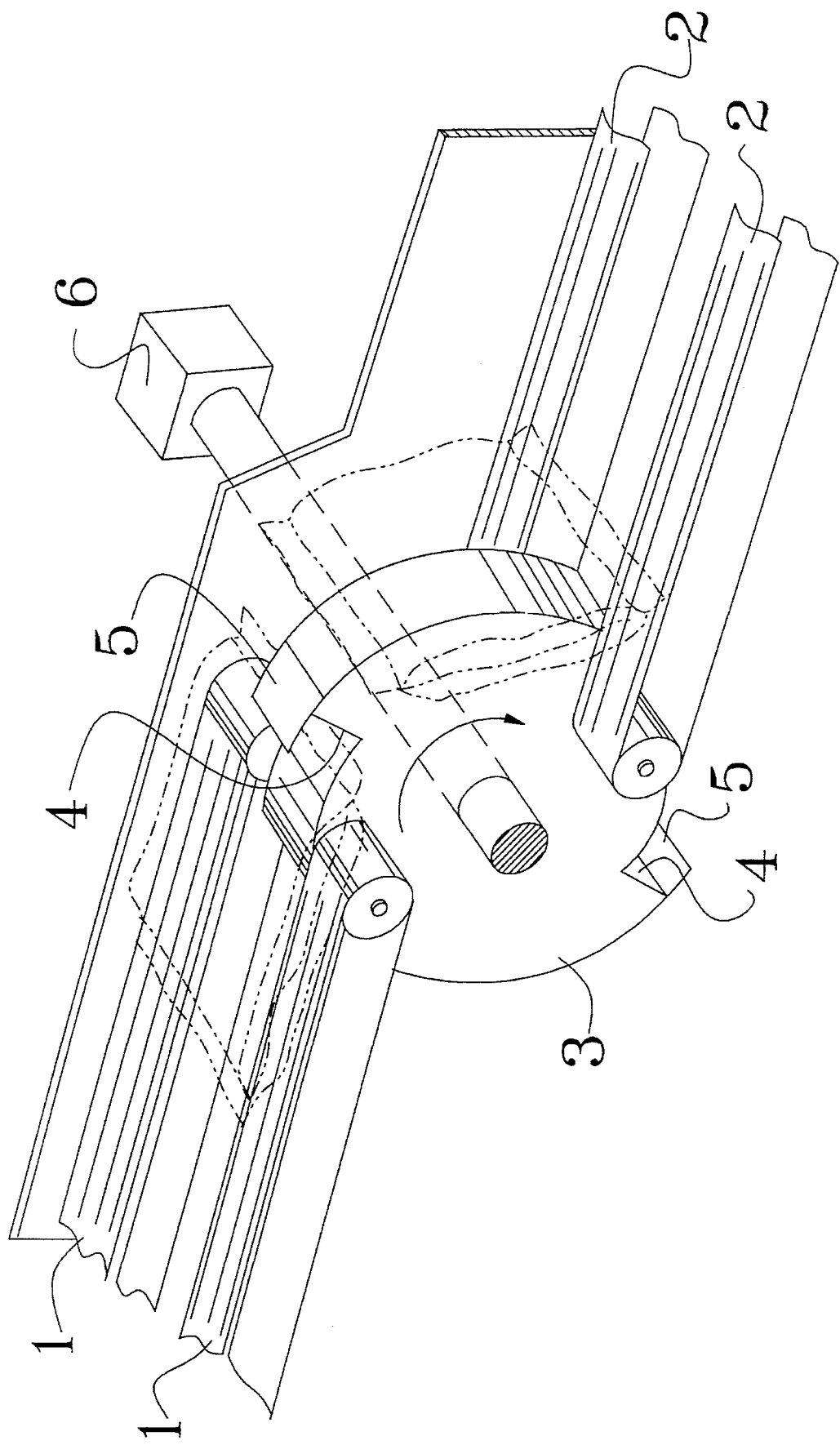
FIG. 1 shows a perspective schematic view of a part of a first embodiment of the device according to the invention.

The device according to FIG. 1 has two conveyor belts 1 placed next to each other some distance apart for the infeed of objects to be placed in a row, two conveyor belts 2 placed next to each other some distance apart for the discharge of overlapping objects arranged in a row slanting backwards, and a rotor 3 to be driven by a motor 6, which rotor is placed partially between the feed belts 1 and partially between the discharge belts 2.

The rotor 3 has two pockets 4 in the form of a Jump in the diameter. The diameter of the cams between the pockets decreases gradually from the outside edge of a pocket 4 to the inside edge of the next pocket 4 and increases by a jump at the position of the next pocket.

A strip 5 running in the peripheral direction of the rotor 3 is fixed at the outside edge of the pockets 4, a chamber being formed at the position of the pockets.

An object lying on the feed belts 1 and approaching a pocket 4 is signalled (for example by means of a photoelectric cell or microswitch). The motor 6 of the rotor 3 is activated, with the result that the rotor rotates in the direction of the arrow and the object is deposited slanting backwards on the discharge belts 2. The cam between the pockets makes space for the object to be placed on the discharge belts 2 behind a row of objects which have already been deposited on said discharge belts 2 and which on rotation of the rotor through the increasing diameter are slid up on the discharge belts 2 or are conveyed by the driven discharge belts 2 over the horizontal width of a backward slanting object. In the latter case the object deposited on the discharge belts can be signalled by, for example, a photoelectric cell or microswitch Giving a signal to the drive motor of the discharge belts 2. A well-coordinated row of backward slanting objects whose top edges lie in one horizontal plane is thus produced.

As soon as the second pocket 4 of the rotor 3 takes up a vertical position at the top side of the rotor, the rotor stops and waits for a signal that the next object is approaching said pocket.

Figure 2:
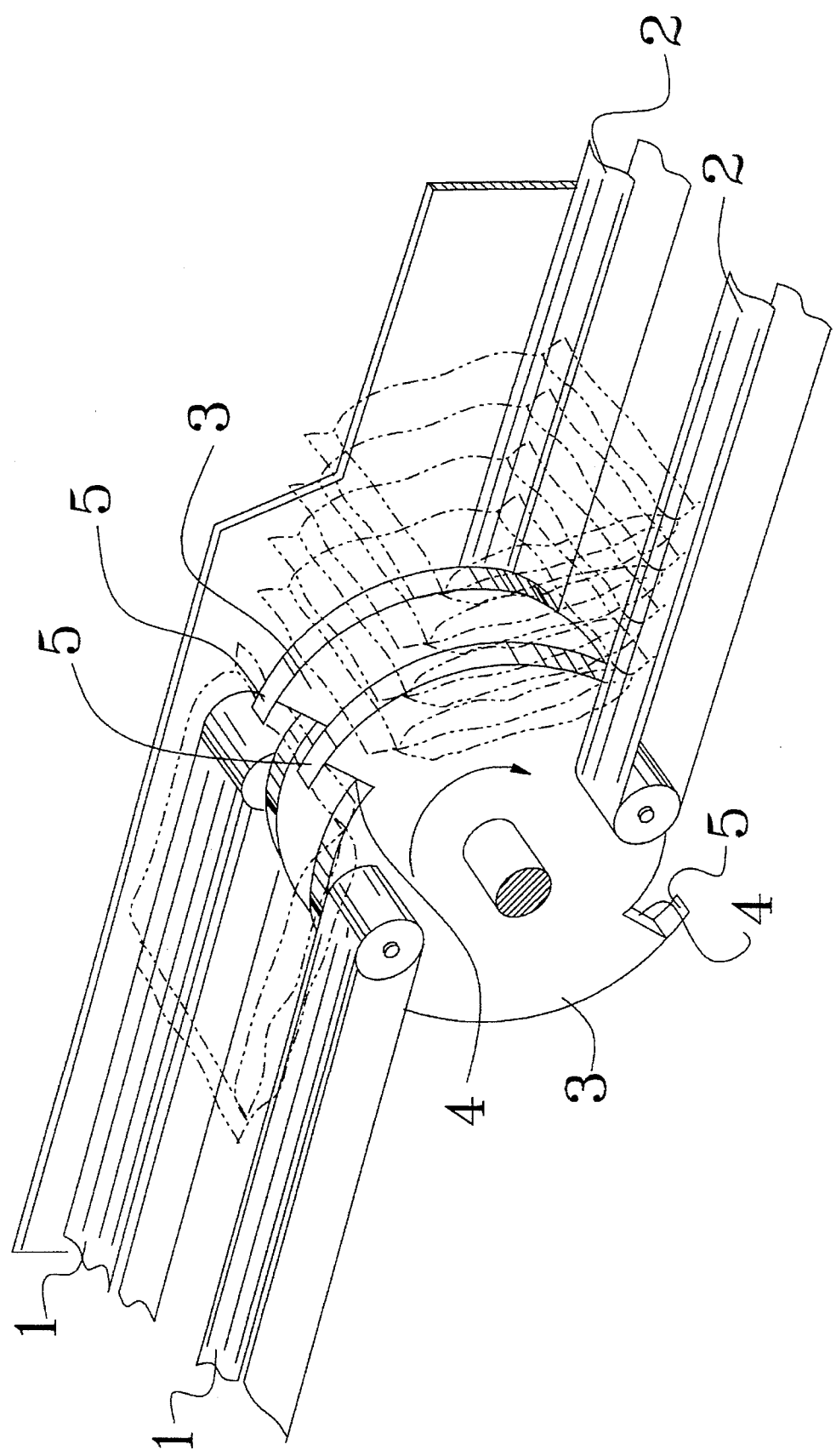
FIG. 2 shows a perspective schematic view of a part of a second embodiment.

The embodiment shown in FIG. 2 differs from that of FIG. 1 only in that two rotors 4 are placed a slight distance apart on the same shaft.

Figure 3:
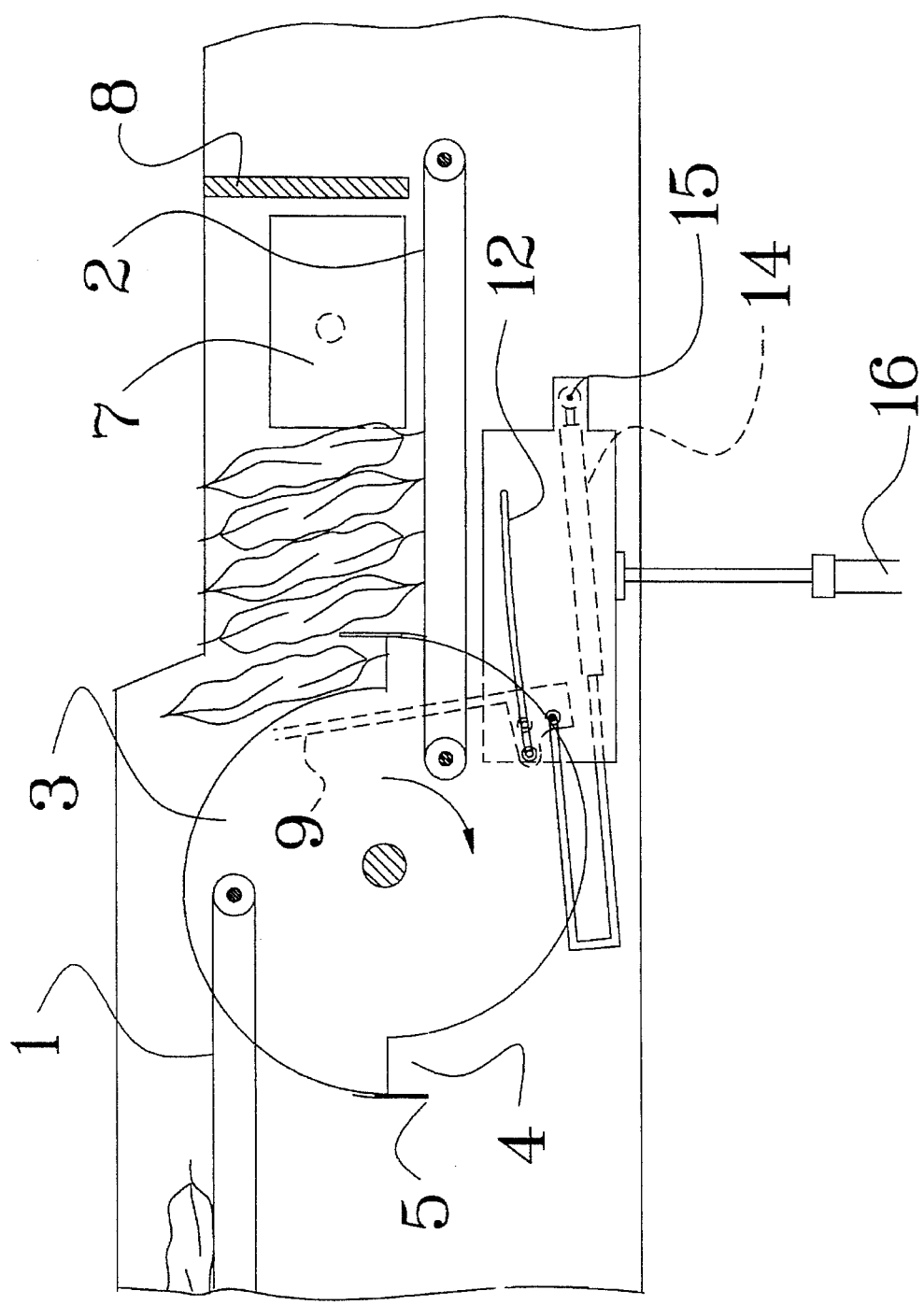
FIG. 3 shows a side view of the device according to FIG. 2, also provided with means for pushing objects collected in a row into an upright position against a stop.
Figure 4:
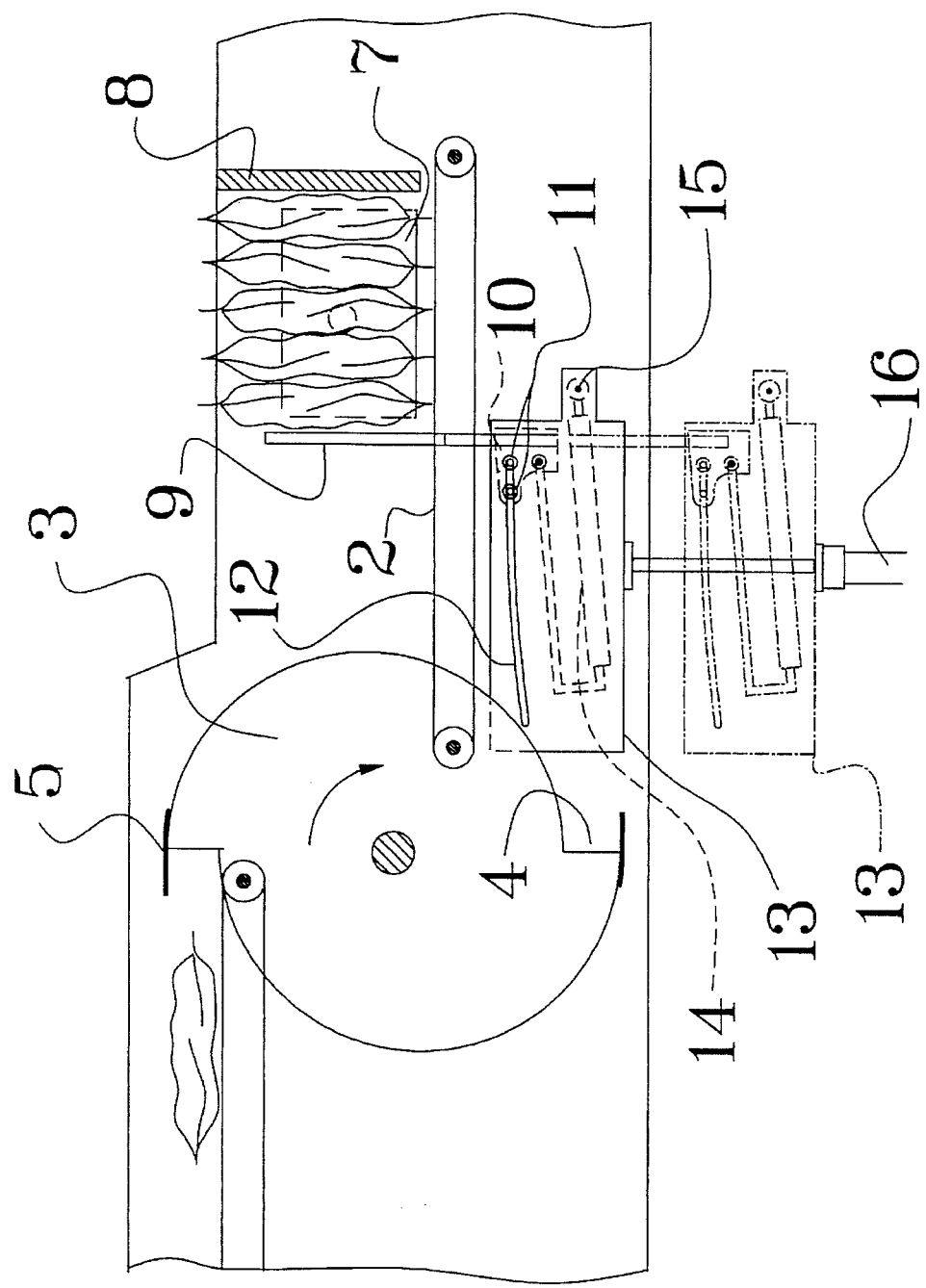
FIG. 4 shows a side view corresponding to that of FIG. 3, in which a row of objects is pushed into the upright position against a stop.

As FIGS. 3 and 4 show, the device according to FIG. 2 can also be provided with means for pressing a certain number of objects (five in the embodiment shown) in an upright position against each other so that the row of objects can be pushed by means of a hydraulically or pneumatically operated pressure plate 7 into a tilted outer, which is not shown.

Said means comprise a fixed stop 8 and a movable partition 9 which is connected to a shoe 10, which is fitted in a box 13 so that it is movable by means of rollers 11 on a track 12. This box 13 contains a hydraulic or pneumatic cylinder 14 which can pivot slightly at 15. The box 13 can be moved up and down by means of a hydraulic or pneumatic cylinder 16. Through operation of the cylinders 14 and 16, the partition 9 can in succession be moved up behind a row of objects between the rotors 3 and between the discharge belts 2, moved in the direction of the stop 8, lowered, and returned to the initial position near the rotors.

Various variants are possible within the scope of the invention. For example, one feed belt 1, one discharge belt 2, and two rotors 3 placed on either side of the discharge end of the feed belt and the feed end of the discharge belt could be used. The rotors 3 can also have one pocket or more than two pockets 4.

What is essential for the invention is that the objects, viewed in the feed direction, are deposited slanting backwards on a discharge belt, and that for the addition of the next object to a row space is created at the rear side of a row of objects by means of a cam in a rotor or two rotors placed on one shaft, in which space the object to be added is placed. The discharge belts 2 can be provided with a profile in order to prevent the objects from slipping out of a slanted position.

The invention is not limited to collecting filled bags in a row, but is also suitable for boxes, newspapers and the like.

The result of use of the invention is that the objects when placed in an upright position do not shoot up, and that the top edges of the objects thus remain lying in a horizontal plane.

I claim:

1. A device for placing filled bags in a horizontal row on a conveyor, said bags having a horizontal width defined along the row, said device comprising:

a) a rotor having a circumference, a radius, and a circumferential cam surface defining a plurality of bag-receiving pockets equally angularly spaced around said circumference, said cam surface decreasing gradually from one pocket to a next pocket and defining each said pocket with an outward jump in radius;

b) a substantially horizontal infeed conveyor for feeding said bags one by one to said pockets of said rotor;

c) an intermittently movable drive motor for said rotor activatable in response to a bag on said infeed conveyor approaching a pocket;

d) a substantially horizontal discharge conveyor for receiving said bags from said pockets in said row with a backwardly slanted orientation referring to a direction away from said rotor said cam means acting to provide a space to receive a bag discharged from said discharge conveyor, said discharge conveyor being activatable when a bag is deposited on said discharge conveyor and being stoppable when a discharged bag having said backwardly slanted orientation has been moved along said discharge conveyor substantially the distance of said horizontal width of a bag;

e) a stop member to limit movement of said row of bags on said discharge conveyor; and f) a pusher to move a number of backwardly slanted overlapping bags on said discharge conveyor into an upright position against said stop member.

2. A device according to claim 1, wherein said discharge conveyor comprises a plurality of conveyor belts.

3. A device according to claim 1 comprising two said rotors supported on a common shaft wherein said infeed conveyor has a discharge end extending between said two rotors.

4. A device according to claim 3 wherein said infeed conveyor comprises two adjacent feed belts having infeed ends and said discharge conveyor comprises two adjacent discharge belts having discharge ends, said infeed belts and discharge belts extending with their discharge ends and feed ends respectively on either side of said rotors.

5. A device according to claim 1 wherein said infeed conveyor comprises two adjacent feed belts having infeed ends and said discharge conveyor comprises two adjacent discharge belts having discharge ends, said infeed belts and discharge belts extending with their discharge ends and feed ends respectively on either side of said rotor.

6. A device according to claim 1 wherein said pusher comprises a partition and a mechanism for successively moving said partition upwardly near said rotor, in a direction away from said rotor, downwardly, and in a direction towards said rotor.

7. A device according to claim 1 wherein said discharge conveyor is profiled to prevent said bags slipping out of said slanted position.

8. A device according to any one of the preceding claims wherein said pusher, said stop and said discharge conveyor are cooperable to re-orient said row of bags to have top edges lying essentially in one plane.

* * * * *